United States Patent
Larsson

(10) Patent No.: US 8,798,099 B2
(45) Date of Patent: Aug. 5, 2014

(54) METHOD AND ARRANGEMENT IN A WIRELESS COMMUNICATION SYSTEM

(75) Inventor: Peter Larsson, Solna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 174 days.

(21) Appl. No.: 13/130,990

(22) PCT Filed: Jul. 5, 2010

(86) PCT No.: PCT/SE2010/050778
§ 371 (c)(1),
(2), (4) Date: May 24, 2011

(87) PCT Pub. No.: WO2011/152767
PCT Pub. Date: Dec. 8, 2011

(65) Prior Publication Data
US 2012/0044839 A1    Feb. 23, 2012

Related U.S. Application Data

(60) Provisional application No. 61/350,056, filed on Jun. 1, 2010.

(51) Int. Cl.
*H04J 13/00* (2011.01)
(52) U.S. Cl.
USPC .......................................... 370/479; 343/729
(58) Field of Classification Search
USPC ............ 370/277, 479; 375/299, 295; 343/729
See application file for complete search history.

(56) References Cited

U.S. PATENT DOCUMENTS

| 7,813,261 B2* | 10/2010 | Ma et al. ................... 370/203 |
| 2006/0025178 A1* | 2/2006 | Tao et al. ................ 455/562.1 |
| 2007/0281633 A1* | 12/2007 | Papadopoulos ............. 455/101 |

FOREIGN PATENT DOCUMENTS

| WO | 03/075470 A2 | 9/2003 |
| WO | 2008/115949 A2 | 9/2008 |
| WO | 2008/116075 A1 | 9/2008 |
| WO | WO 2010030213 A1 * | 3/2010 ............... H04L 1/06 |

OTHER PUBLICATIONS

EPO, Int' Search Report in PCT/SE2010/050778, Feb. 11, 2011.
EPO, Written Opinion in PCT/SE2010/050778, Jun. 14, 2011.
V. Tarokh et al., Space-Time Codes for High Data Rate Wireless Communication: Performance Criterion and Code Construction, IEEE Trans. Info Theory, Mar. 1998, pp. 744-765, vol. 44, No. 2.
S.M. Alamouti, A Simple Transmit Diversity Technique for Wireless Communications, IEEE J. Select Areas in Comms., Oct. 1998, pp. 1451-1458, vol. 16, No. 8.

* cited by examiner

*Primary Examiner* — Omer S Mian
(74) *Attorney, Agent, or Firm* — Patent Portfolio Builders PLLC

(57) ABSTRACT

The present invention relates to a method and a transmitting unit in a wireless communication system. The transmitting unit is configured to transmit over multiple antennas pointing in different directions. Each antenna provides a beam partially overlapping with at least one other antenna. The method for the transmitting unit comprises switching in time between transmitting (910) in a unicast mode over each of said at least two antennas, and transmitting (920) in a broadcast mode concurrently over all of the at least two antennas using a space time code.

20 Claims, 10 Drawing Sheets

METHOD AND ARRANGEMENT IN A WIRELESS COMMUNICATION SYSTEM

TECHNICAL FIELD

The present invention generally relates to a method in a transmitting unit of a wireless communication system and to a transmitting unit. In particular it relates to a method of adapting the radiation pattern from a transmitting unit configured to transmit in a broadcast mode over at least two antennas radiating in different directions.

BACKGROUND

The Universal Mobile Telecommunication System (UMTS) is one of the 3G mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and evolved UTRAN (e-UTRAN) is the radio access network of an LTE system. As illustrated in FIG. 1, a radio access network typically comprises user equipments (UE) 150 wirelessly connected to radio base stations (RBS) 110a-c, commonly referred to as NodeB (NB) in UTRAN and eNodeB (eNB) in e-UTRAN.

Multimedia Broadcast and Multicast Services-Single Frequency Network (MBMS-SFN or MBSFN) is a broadcasting service that may be offered in cellular networks such as LTE, e.g. to support mobile TV. MBSFN offers an option to use an uplink channel for interaction between the service and the user, which is not a solution in usual broadcast networks. For example conventional digital television is only a one-way (unidirectional) system. SFN refers to that several transmitters simultaneously send the same signal over the same frequency channel. The aim of SFNs is efficient utilization of the radio spectrum, allowing a higher number of radio and TV programs in comparison to traditional multi-frequency network (MFN) transmission. An SFN may also increase the coverage area and decrease the outage probability in comparison to an MFN, since the total received signal strength may increase in positions midway between the transmitters.

In some situations, it is desired to have radio sites, such as RBSs in a cellular system, that alternate between a unicast service with transmission in multiple sectors and a broadcast service, such as MBSFN, using all antennas of the site concurrently for the transmission. In a first mode of operation, i.e. the dedicated unicast mode, the RBS covers several sectors or coverage areas with antennas pointing in different directions. This first mode is described with reference to FIGS. 2a-2c, showing an example of a site transmitting in unicast mode. In FIG. 2a three different unicast signals $S1(t)$, $S2(t)$ and $S3(t)$ are transmitted over the three antennas 1, 2, 3 respectively, each signal using a dedicated power amplifier 20a-c. The three antennas 1, 2, 3 are pointing in different directions, as shown in FIG. 2b, and are thus covering different sectors or coverage areas as shown in FIG. 2c illustrating the beam pattern for each of the antennas 1, 2, and 3.

In a second mode of operation, also called the broadcast mode, a same signal $S4(t)$ is broadcasted to users positioned in any direction around the site. With MBSFN for LTE, sites are synchronized and transmissions occur concurrently and on the same frequency resource from the different sites. The overall idea of broadcast services such as MBSFN, is to transmit an information carrying signal in all directions. With a site with antennas pointing in different directions, as the one schematically illustrated in FIG. 2b, a straightforward configuration used for MBSFN is illustrated in FIG. 3a. As coverage is vital for broadcasting, all existing PAs are used.

A problem with the above described second mode of operation in a configuration as the one illustrated in FIG. 3a and with the antennas configured as in FIG. 2b, is explained with reference to FIGS. 3b and 3c illustrating the resulting radiation diagram from all three antennas 1, 2, 3, together. The diagram in FIG. 3b and FIG. 3c corresponds to a configuration where $d/\lambda=2$ and $d/\lambda=3$ respectively, where the distance d is given in FIG. 2b, and $\lambda$ is the wavelength of the carrier. The resulting beam pattern will contain a lot of deep nulls, i.e. very low radiated power in certain directions. This will e.g. be the case in the areas where the beam patterns from two of the antennas are overlapping. It should be noted that the radiation diagrams in FIGS. 3b and 3c, are illustrated with a linear scale. With a logarithmic scale the variations in signal amplitude would be less dramatic. The conclusion is that such a site, which in this example is a site with three PAs and three antennas, where the antennas are pointing in the directions 0°, 120° and 240°, will provide inadequate directional coverage when transmitting in broadcast mode. In the following, the array and antenna-beam pattern models that have been used to compute the resulting radiation pattern are disclosed. The array model used is:

$$z_1 = d \cdot cos(\Theta_1), \Theta_1 = \alpha$$

$$z_2 = d \cdot cos(\Theta_2), \Theta_2 = \alpha + \pi/3$$

$$z_3 = d \cdot cos(\Theta_3), \Theta_3 = \alpha - \pi/3$$

where the parameters d and $\alpha$ are shown in FIG. 4a. $z_n$ (n=1, 2, 3) is the distance difference relative the origin of the diagram (or the centre of the array) for each of the antenna, in a certain direction given by the angle $\alpha$ under consideration. Furthermore, a simple beam pattern model for an antenna is assumed according to the following:

$$g(\varphi) \sim \frac{\sin(v\varphi)}{v\varphi}$$

where $\phi$ is the angle relative to the main direction of the antenna, and $v$ is a parameter that indicates how compact the beam from the antenna is. The parameter $v$ may vary between different types of antennas. The beam pattern, i.e. the antenna power in different angles, for different values of the parameter $v$ is illustrated in FIG. 4b. A real value of the antenna gain is assumed, which is not necessarily true in reality but may be used as a model to demonstrate the general idea.

Finally, the superposed electromagnetic field $r(\alpha)$ in the far field and in a certain angle $\alpha$ may be computed according to the following equation:

$$r(\alpha) = g(\varphi_1)e^{j\frac{2\pi z_1}{\lambda}} + g(\varphi_2)e^{-j\frac{2\pi z_2}{\lambda}} + g(\varphi_3)e^{-j\frac{2\pi z_3}{\lambda}}$$

where $$\varphi_1 = \alpha, \varphi_2 = \text{rem}\left(\frac{5\pi}{3} - \alpha, 2\pi\right) - \pi, \varphi_3 = \text{rem}\left(\frac{7\pi}{3} - \alpha, 2\pi\right) - \pi$$

SUMMARY

It is an object of the embodiments of the present invention to address the above mentioned problem, and to provide a method and a transmitting unit that allows instant switching between a unicast and a broadcast mode, with a defined coverage area for the broadcast mode avoiding the directional nulls. This object and others are achieved by the methods and devices according to the independent claims, and by the embodiments according to the dependent claims.

In accordance with a first aspect of embodiments of the present invention, a method for a transmitting unit in a wireless communications system is provided. The transmitting unit is configured to transmit over at least two antennas pointing in different directions, and each antenna is providing a beam partially overlapping with at least one other of said antennas. The method comprises switching in time between transmitting in a unicast mode over each of the at least two antennas, and transmitting in a broadcast mode concurrently over all of the at least two antennas using a space time code.

In accordance with a second aspect of embodiments of the present invention, a transmitting unit for a wireless communications system is provided. The transmitting unit is configured to transmit over at least two antennas pointing in different directions, each antenna providing a beam partially overlapping with at least one other of said antennas. The transmitting unit comprises a signal processing unit adapted to transmit in a unicast mode over each of said at least two antennas, and to transmit in a broadcast mode concurrently over all of the at least two antennas using a space time code. It also comprises a control unit configured to switch in time between transmitting in the unicast mode and in the broadcast mode.

An advantage of embodiments of the present invention is that they provide a defined beam pattern in the broadcast mode when transmitting over antennas pointing in different directions, avoiding the directional nulls.

Another advantage of embodiments of the present invention is that the beam pattern from a site can alternate between the multiple sector unicast mode to broadcast mode on an instantaneous basis.

A further advantage of embodiments of the present invention is that they can provide a near omni-directional beam pattern in the broadcast mode.

Still another advantage of embodiments of the present invention is that the beam pattern, and hence the line of sight (LoS) signal to noise ratio (SNR), is the same for all frequencies, such as for all OFDM subcarriers.

Other objects, advantages and novel features of the invention will become apparent from the following detailed description of the invention when considered in conjunction with the accompanying drawings.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of a method and device, the invention may also be embodied in a computer program product as well as in a system comprising a computer processor and a memory coupled to the processor, wherein the memory is encoded with one or more programs that may perform the functions disclosed herein.

The embodiments of the present invention are described herein by way of reference to particular example scenarios. In particular embodiments of the invention are described in a non-limiting general context in relation to an e-UTRAN, and LTE or LTE-advanced. It should though be noted that the invention and its embodiments may also be applied to other types of radio access networks with support for multi-antenna transmission and a broadcast service, such as WiMAX. It should be noted that the notation and terminology used in the description may change and does by no means restrict the applicability of embodiments of the present invention.

Figure 5A:
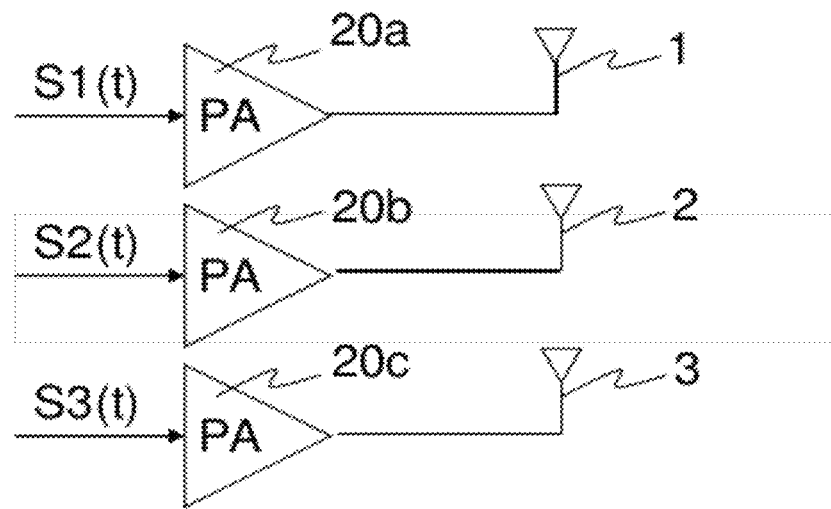
FIGS. 5a-b illustrate schematically the antenna configuration of the multi-sector unicast mode and of the omni-directional broadcast mode according to embodiments of the present invention.
Figure 5B:
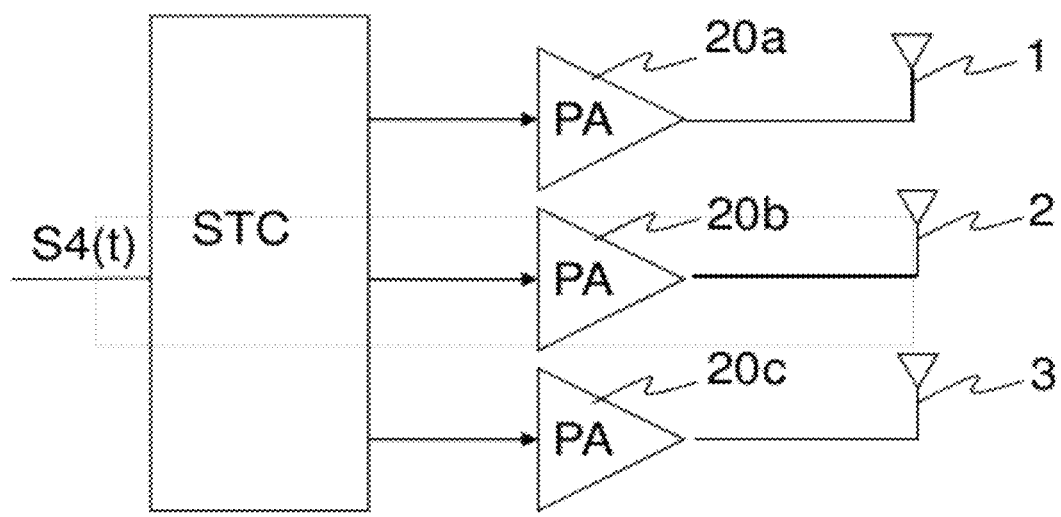

Embodiments of the present invention are based on that the eNB transmission switches from the multi-sector unicast mode schematically illustrated in FIG. 5a, to the broadcast mode schematically illustrated in FIG. 5b, and when transmitting in the broadcast mode, a space time code (STC) is also applied to the signal.

STC is a general term used to indicate multi-antenna transmission schemes where modulation symbols are mapped in the time and spatial transmit-antenna domain to capture the diversity offered by the multiple transmit antennas. STC is conventionally used as a method employed to improve the reliability of data transmission in fading channels using multiple transmit antennas pointing in the same direction and thus having completely overlapping beams. STC may be split into two main types:

Space-time trellis codes (STTC) distribute a trellis code over multiple antennas and multiple time-slots and provide both coding gain and diversity gain.

Space-time block codes (STBCs) act on a block of data at once (similarly to block codes) and provide only diversity gain, but are much less complex in implementation terms than STTCs.

STC involves the transmission of multiple redundant copies of data to compensate for fading and thermal noise in the hope that some of them may arrive at the receiver in a better state than others. In the case of STBC in particular, the data stream to be transmitted is encoded in blocks, which are distributed among spaced antennas and across time. While it is necessary to have multiple transmit antennas, it is not necessary to have multiple receive antennas.

An STBC is usually represented by a matrix. Each row represents a time slot (T represents the number of rows, also called the "length" of the block) and each column represents one antenna's transmissions over time. The code rate of an STBC measures how many symbols per time slot it transmits on average over the course of one block. If a block encodes k symbols, the code-rate is $$r = \frac{k}{T}.$$

The STC operation can be either in the frequency domain, or in the time domain, or in both domains. If it is in the frequency domain, the term space frequency code (SFC) is often used. Space frequency block coding (SFBC) is similar to STBC, with the difference that encoding is carried out in the antenna/frequency domains rather than in the antenna/time domains. SFC is suitable in systems using orthogonal frequency division multiplexing (OFDM), such as LTE, and other "frequency-domain" transmission schemes. The term STC will hereinafter encompass any of the terms mentioned above (STC, STBC, SFC, SFBC).

The core idea of embodiments of the present invention is to allow switching between transmission in the multi-sector unicast mode and in the broadcast mode, and to avoid directional nulls in the broadcast mode. In the broadcast mode, STC is used for site antennas pointing in different directions and having partially overlapping beams. In this way the directional nulls may be avoided. In the unicast mode each antenna sector cover different directions around the site, and no STC is used as it is a single antenna transmission in each sector. A precondition for this solution is to see a site's antennas pointing in different directions as a pool of antennas that can be used jointly or separately.

The antennas may thus e.g. not belong to different eNBs, as the transmission over the different antennas has to be controlled by a same node. The switching between unicast and broadcast mode may e.g. be obtained by controlling the signal processing unit in the eNB to switch between the two modes and to use STC in the broadcast mode. This allows the switch between the transmission modes to be very fast, i.e. from symbol to symbol.

In one embodiment of the present invention, the method of alternating the transmission in unicast mode and in broadcast mode, is preceded by the tuning of some of the individual antenna parameters in order to obtain a resulting beam pattern with a defined characteristic when transmitting in a broadcast mode. It may e.g. be possible to tune the direction in which the antenna is pointing, the antenna beam pattern, and/or the power amplifier for an antenna. According to one embodiment, a specific configuration of antennas and antenna parameters may form a resulting beam pattern which is experienced as a near omni-directional beam pattern. Such a beam pattern is favorable for many broadcast services. A plurality of other beam pattern characteristics is of course also possible with another configuration of the antenna parameters.

In embodiments of the present invention, the antennas of the RBS site may be multiple ordinary single antennas, or antenna arrays such as phased arrays. A phased array is a group of antennas in which the relative phases of the respective signals feeding the antennas are varied in such a way that the effective radiation pattern of the array is reinforced in a desired direction and suppressed in undesired directions. Greater flexibility and control can thus be obtained with an antenna array compared to a single antenna. This may be an advantage when it is desired to tune the beam pattern from each of the antennas in order to obtain a defined resulting beam pattern in the broadcast mode, as explained above.

The motivation for using e.g. STBC in the broadcast mode is explained hereinafter. The square magnitude, which would correspond to the SNR of the effective channel when using STBC is:

$$|h|^2 = \sum_{j=1}^{J} |h_j|^2 \qquad [1]$$

where $h_j$ is the complex channel gain for antenna direction j. An angular dependence for $h_j$ is introduced, as the antennas point in different directions and as a beam-strength in the azimuth angle $\alpha$ is considered. Further, in contrast to the normal STC scenario where STC combat fading channels in e.g. an urban area with many reflected signals and $h_j$ is varying over time or frequency, the considered beam-pattern scenario is a line of sight (LoS) scenario. Hence, $h_j$ has a fixed magnitude at some fixed communication distance. Further, the phase varies with the angle $\alpha$ as the signal experience different propagation distances from each antenna. The effective radiation pattern may therefore be calculated as $$G(\alpha) = \sum_{j=1}^{J} |h_j(\alpha)|^2 = \sum_{j=1}^{J} G_j(\alpha) \qquad [2]$$

where $G_j(\alpha)$ is the antenna beam pattern for antenna j, accounting for that the antennas are pointing in different directions.

In one embodiment of the present invention, the RBS site comprises three antennas pointing in three different directions, as illustrated in FIG. 5a-b. A 3-antenna STC (or SFC) is thus used in the broadcast mode of this embodiment. For a three sector site—or as in LTE, three cells covering different directions—any of the following 3-antenna space time codes are possible:

$$C_{3,1/2} = \begin{bmatrix} s_1 & s_2 & s_3 \\ -s_2 & s_1 & s_4 \\ -s_3 & s_4 & s_1 \\ -s_4 & -s_3 & s_2 \\ s_1^* & s_2^* & s_3^* \\ -s_2^* & s_1^* & s_4^* \\ -s_3^* & s_4^* & s_1^* \\ -s_4^* & -s_3^* & s_2^* \end{bmatrix}$$

$$C_{3,3/4} = \begin{bmatrix} s_1 & s_2 & \frac{s_3}{\sqrt{2}} \\ -s_2^* & s_1^* & \frac{s_3}{\sqrt{2}} \\ \frac{s_3^*}{\sqrt{2}} & \frac{s_3^*}{\sqrt{2}} & \frac{(-s_1 - s_1^* + s_2 - s_2^*)}{2} \\ \frac{s_3^*}{\sqrt{2}} & -\frac{s_3^*}{\sqrt{2}} & \frac{(s_2 + s_2^* + s_1 - s_1^*)}{2} \end{bmatrix}$$

The first STC ($C_{3,1/2}$) has a rate r=½ (k=4 and T=8 according to the explanation given above), and the second ($C_{3,3/4}$) has a rate of r=¾ (k=3, T=4).

Figure 6:
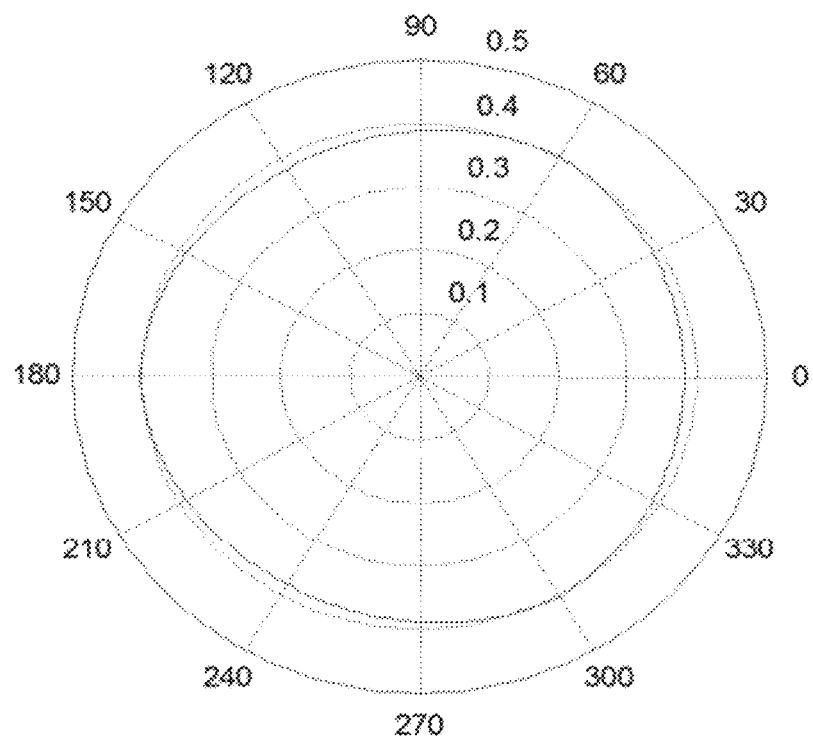
FIG. 6 illustrates schematically the beam pattern for a three sector site with a three antenna STC according to embodiments of the present invention.

The resulting beam-forming diagram for 3-antenna STC in broadcast mode used together with three sector antennas and according to embodiment of the invention is exemplified in FIG. 6. We note a possibility to attain a near ideal omni-directional beam-pattern. A downside of using a 3-antenna STC is that the STC code rate r is below one (r<1). The three antenna STCs mentioned above have r=½ and r=¾. It is known that only 2-antenna STC, the so called Alamouti code, can attain r=1. Nevertheless, even if r<1, the signal to noise ratio (SNR) is increased relative to an r=1 STC code due to the coherent combining of signals. At the cell border e.g., where a low SNR is often a problem, the channel capacity loss due to the lower coder rate is compensated by the increased SNR.

Figure 7:
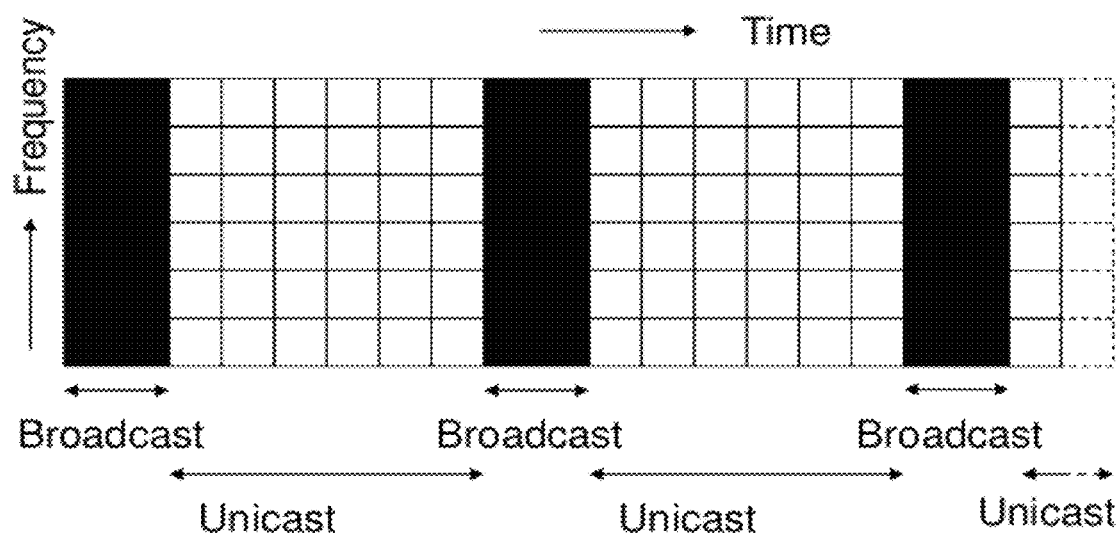
FIG. 7 illustrates schematically the basic frame structure alternating between broadcast and multi-sector unicast modes according to embodiments of the present invention.

In one embodiment of the present invention, the unicast and broadcast mode is typically switched on and off in the time domain. In FIG. 7, an example for OFDM is illustrated. It is however also possible to switch between unicast and broadcast in the frequency domain, which means that a certain block of frequency resources may be used for unicast and another block of frequency resources may be used for broadcast during the same time interval. A combination of switching in the time and in the frequency domain is also possible.

In another embodiment of the present invention, the RBS site comprises four antennas pointing in four different directions. In this embodiment a 2-antenna STC (Alamouti code) may be used in the broadcast mode. The Alamouti code is an attractive code since it is a r=1 STC and as it is implemented in LTE. The Alamouti code is represented by the following matrix:

$$c_2 = \begin{bmatrix} s_1 & s_2 \\ -s_2^* & s_1^* \end{bmatrix}$$

Figure 1:
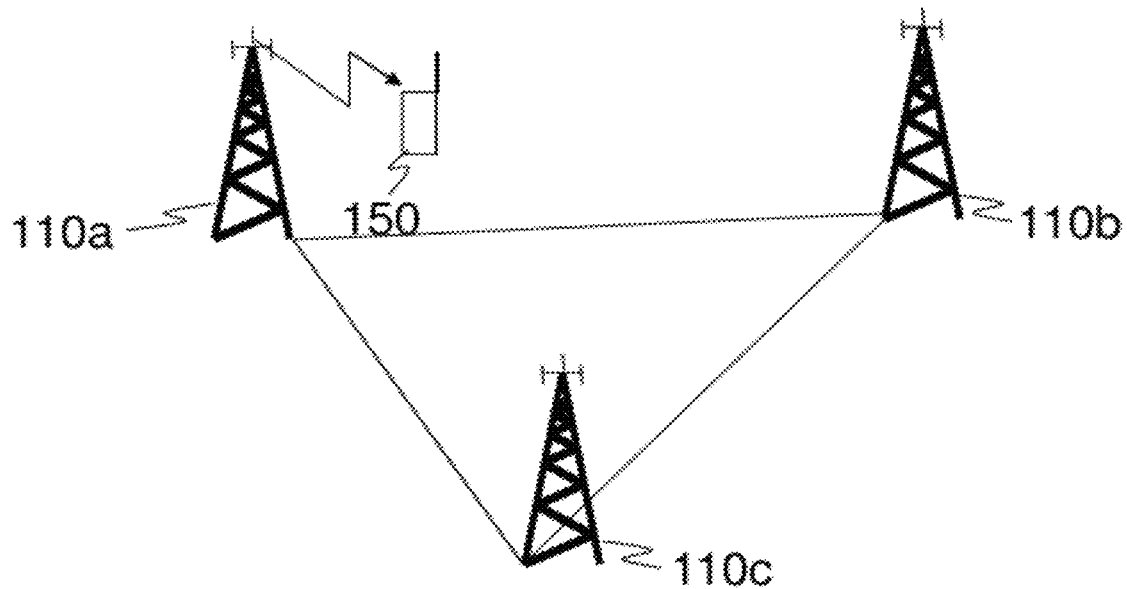
FIG. 1 illustrates schematically a conventional radio access network wherein the present invention may be implemented.
Figure 2A:
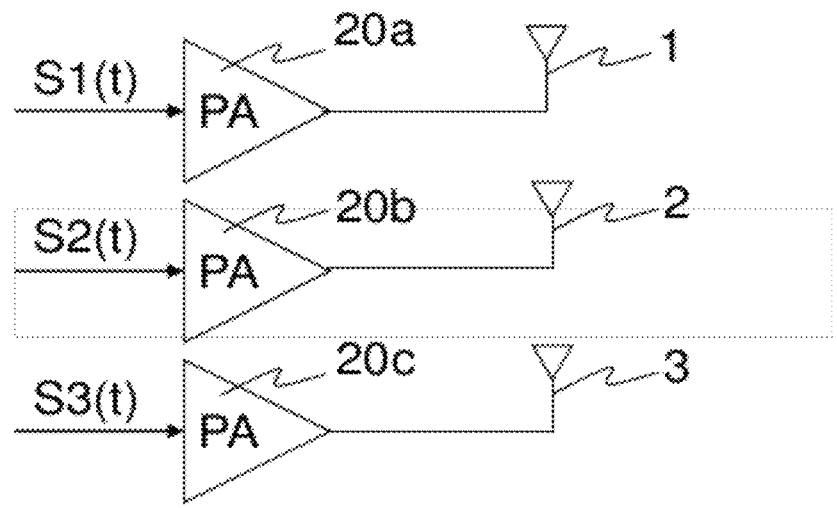
FIGS. 2a-c illustrate schematically the unicast mode communication with three PA for three antennas, the antennas which are pointing in different directions, and the angular dependent coverage for each antenna.
Figure 2B:
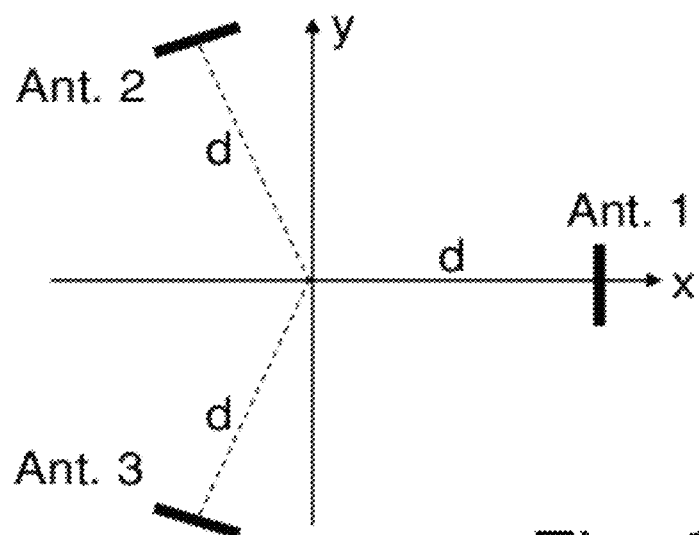
Figure 2C:
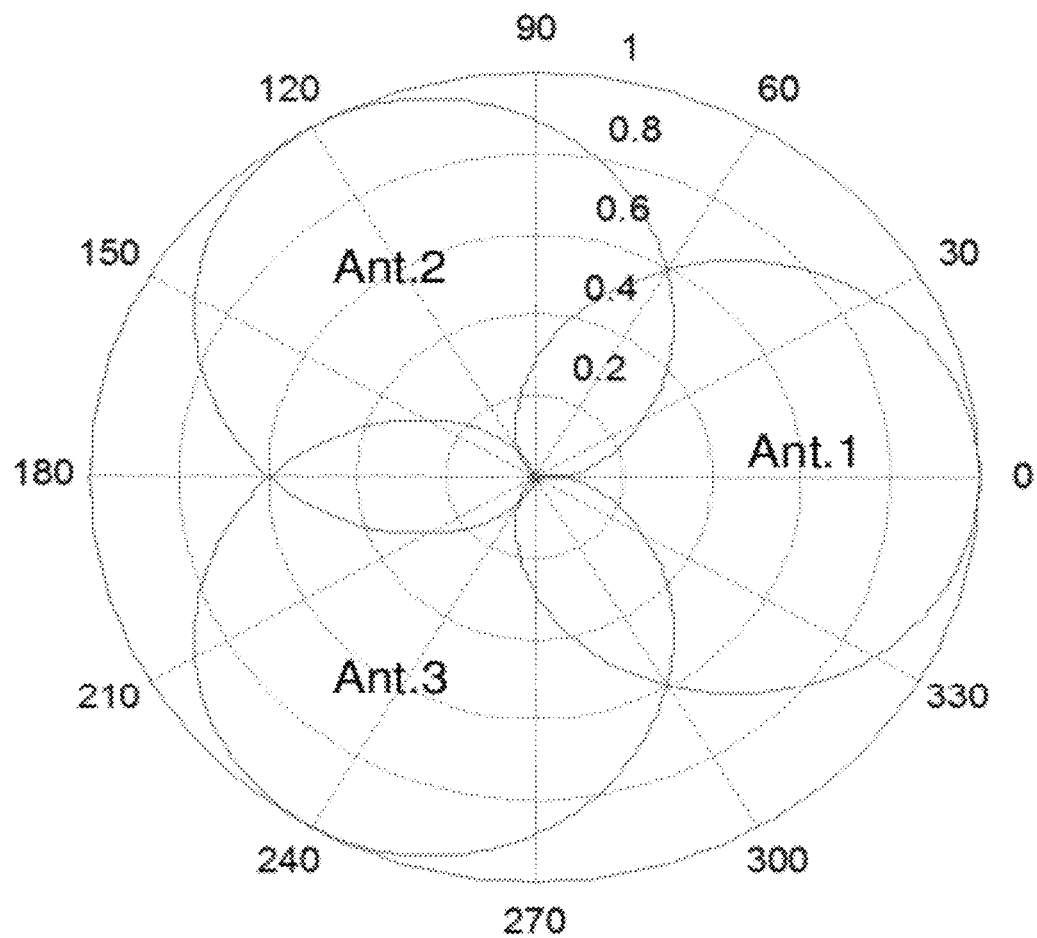
Figure 3A:
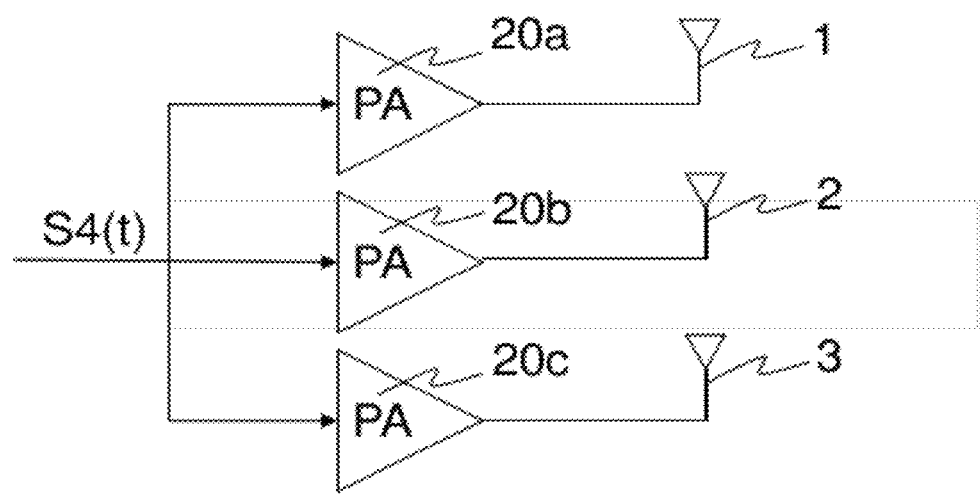
FIG. 3a illustrates schematically an antenna configuration for the broadcast mode according to prior art.
Figure 3B:
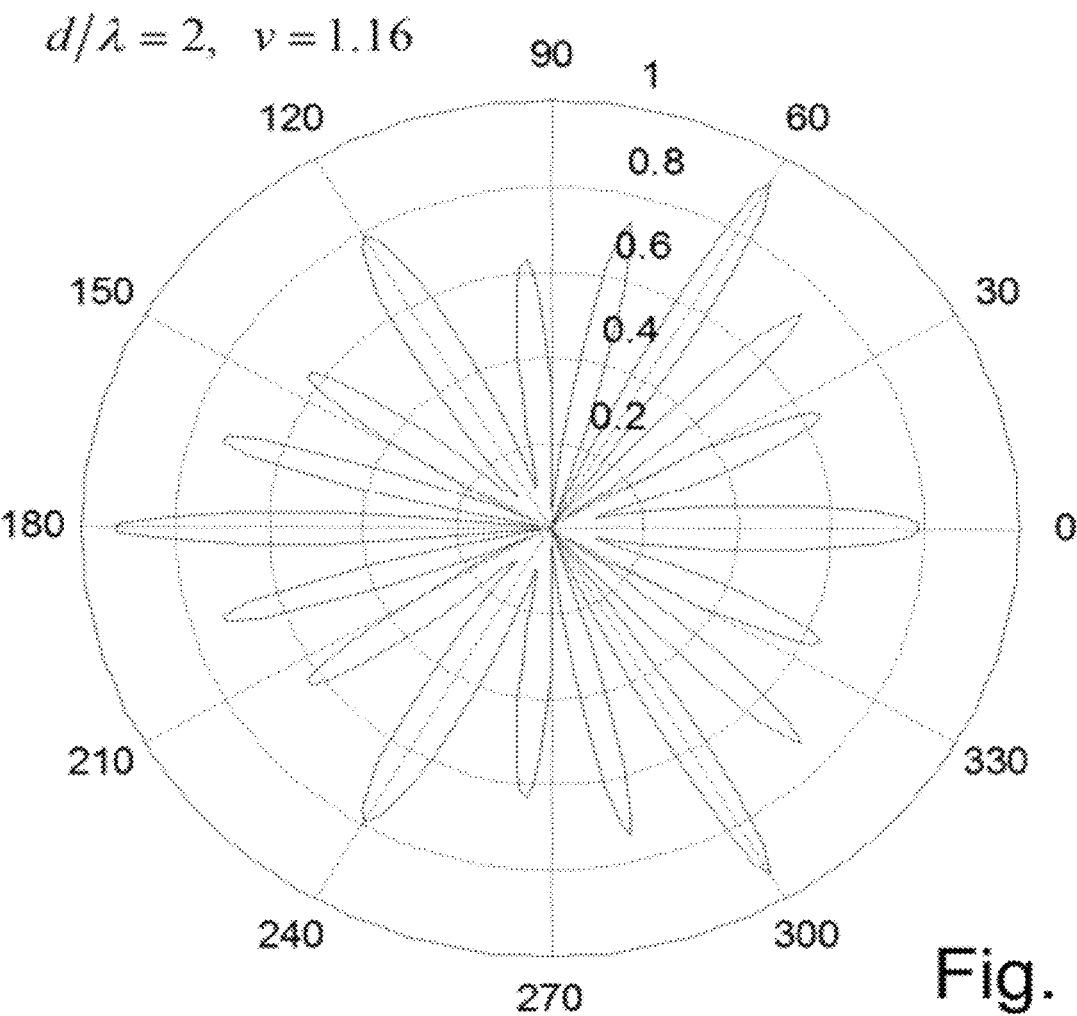
FIGS. 3b-c illustrate schematically the beam pattern for the antenna configuration in FIG. 3a, with antennas directed according to FIG. 2b.
Figure 3C:
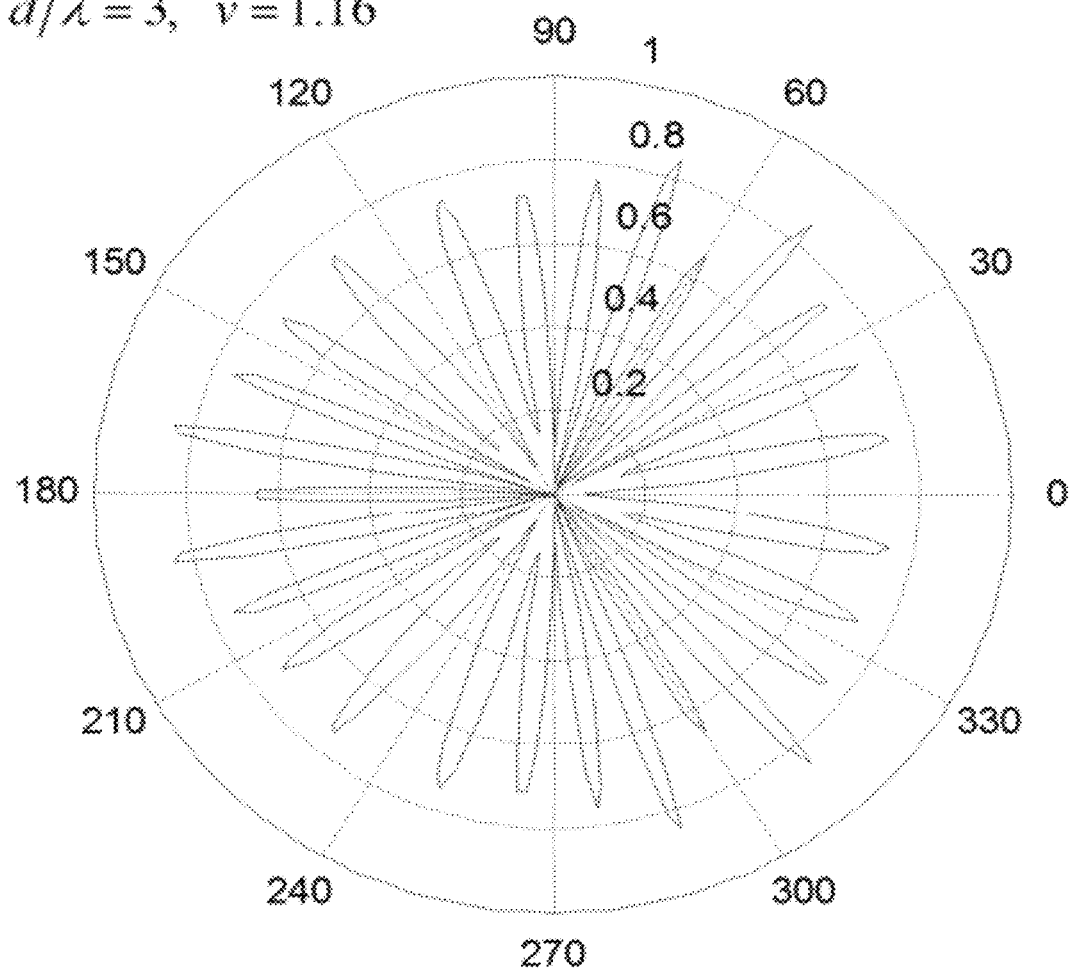
Figure 4A:
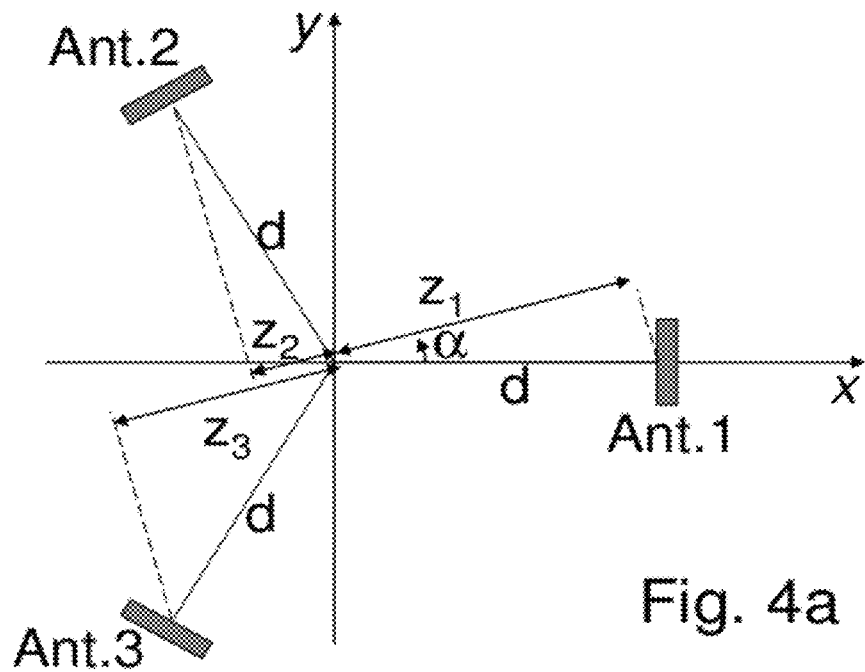
FIGS. 4a-b illustrate schematically the array and antenna beam pattern model used to compute the resulting radiation pattern in FIG. 3b-c.
Figure 4B:
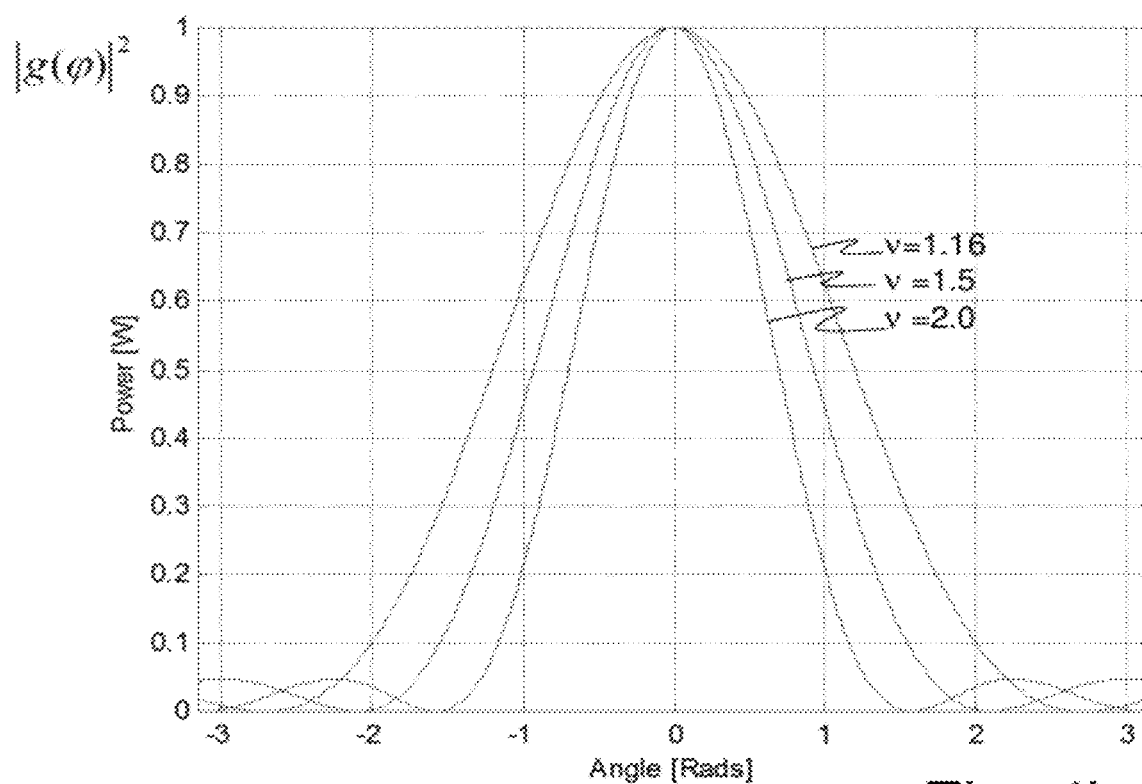
Figure 8A:
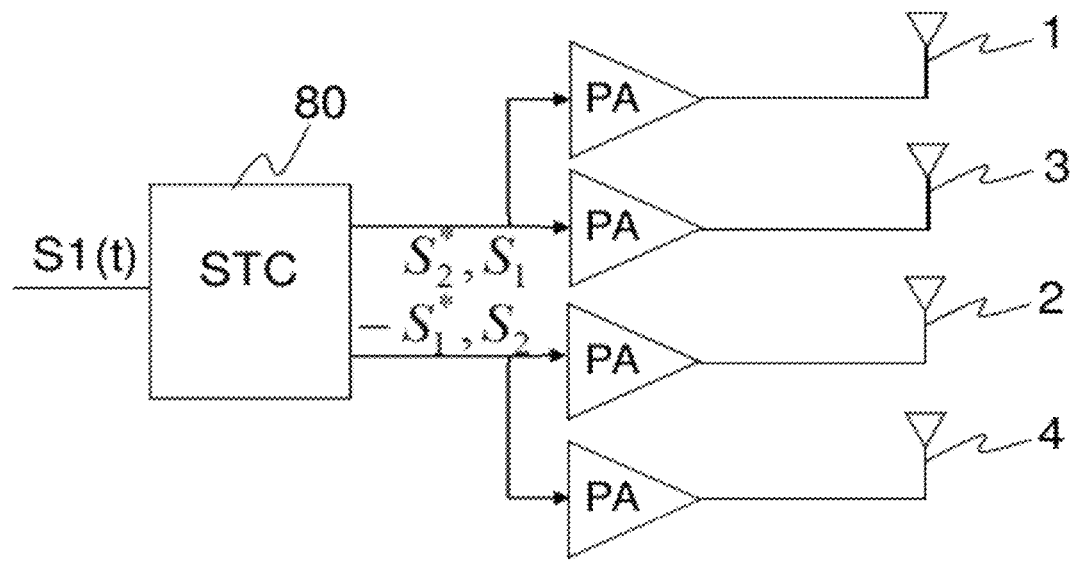
FIGS. 8a-b illustrate schematically the usage of STC Alamouti code with four sector antennas according to embodiments of the present invention.
Figure 8B:
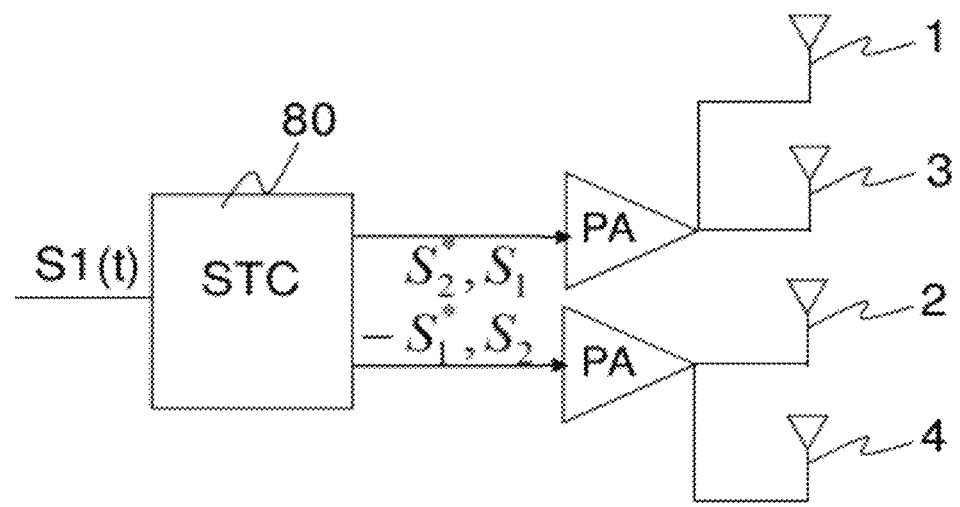

As at least the adjacent antennas, with partially overlapping beams, need to implement different rows of the STC in order to provide a beam-pattern without null directions as in the beam patterns illustrated in FIGS. 3*b-c*, a 2-antenna Alamouti code is incompatible with 3-antenna sectors. However, this code is compatible with an even number of antenna sectors. In FIGS. 8*a-b*, two different embodiments of the present invention with four antennas 1, 2, 3 and 4 are illustrated. The STC encoder 80 is configured to use the Alamouti code represented by the matrix given above. As sites occasionally have six or even eight sectors, and six and eight are even numbers, this approach with the Alamouti code is directly extendable to the 6/8-antenna case. It is important to note that antennas with overlapping beams (as e.g. antenna 1 and 2 in the embodiments illustrated in FIG. 8*a-b*) need to transmit signals from different outputs of the STC encoder 80.

In still another embodiment of the present invention, signals may in addition to the above described embodiments be spatially multiplexed in the polarization domain. In the above described embodiments, it is assumed that antennas of the same polarization are used.

Figure 9:
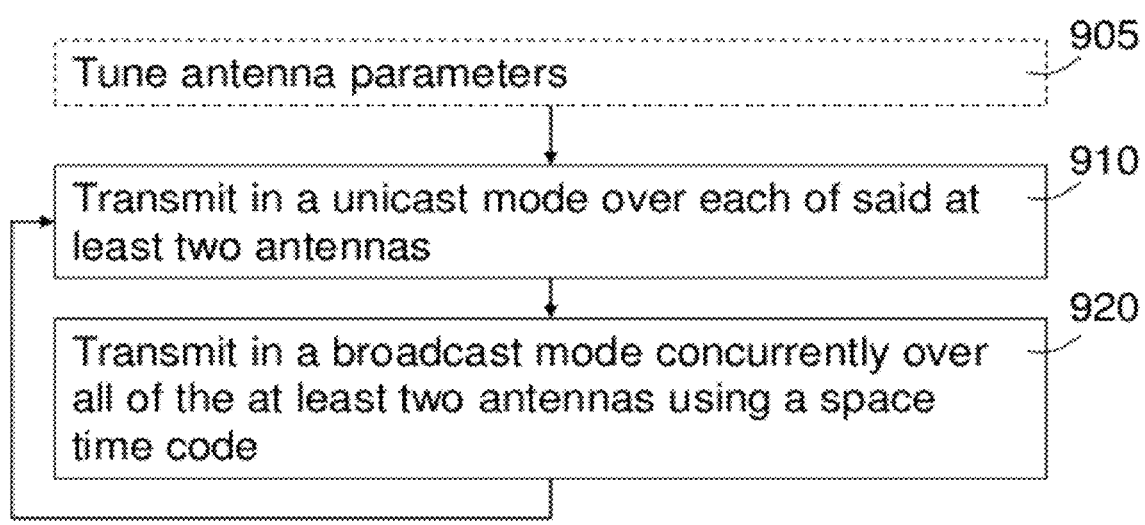
FIG. 9 is a flowchart of the method in the transmitting unit according to embodiments of the present invention.

FIG. 9 is a flowchart of the method in the transmitting unit, according to embodiments of the present invention. The transmitting unit is configured to transmit over two or more antennas pointing in different directions, each antenna providing a beam partially overlapping with at least one other antenna. The antennas are thus covering different sectors around the site of the transmitting unit. In one embodiment the antennas may be antenna arrays. The method illustrated in the flowchart comprises switching or alternating in time between:

910: Transmitting in a unicast mode over each of the at least two antennas. There may thus be two parallel unicast transmissions for users in different sectors in this mode.

920: Transmitting in a broadcast mode concurrently over all of the at least two antennas using a space time code. In this broadcast mode users all around the transmitting unit are reached. In one embodiment three antennas are used, allowing for a near omni-directional coverage of the broadcast transmission. In an alternative embodiment, the transmitting unit is configured to transmit over an even number of antennas pointing in different directions. This allows for the use of the Alamouti space time code which has a code rate equal to one. In still another embodiment the broadcast mode uses a MBSFN, which is the service used for broadcast in e.g. e-UTRAN.

In one embodiment of the present invention, the method also comprises the initial step of tuning, in 905, one or more of the antenna directions, the antenna beam patterns, and the power amplifiers of each of the antennas. This may be done in order to obtain a resulting beam pattern with a defined characteristic when transmitting in the broadcast mode, concurrently over all of the antennas. In one example, the defined beam pattern characteristic may be a near omni-directional beam pattern, as already explained above.

Figure 10:
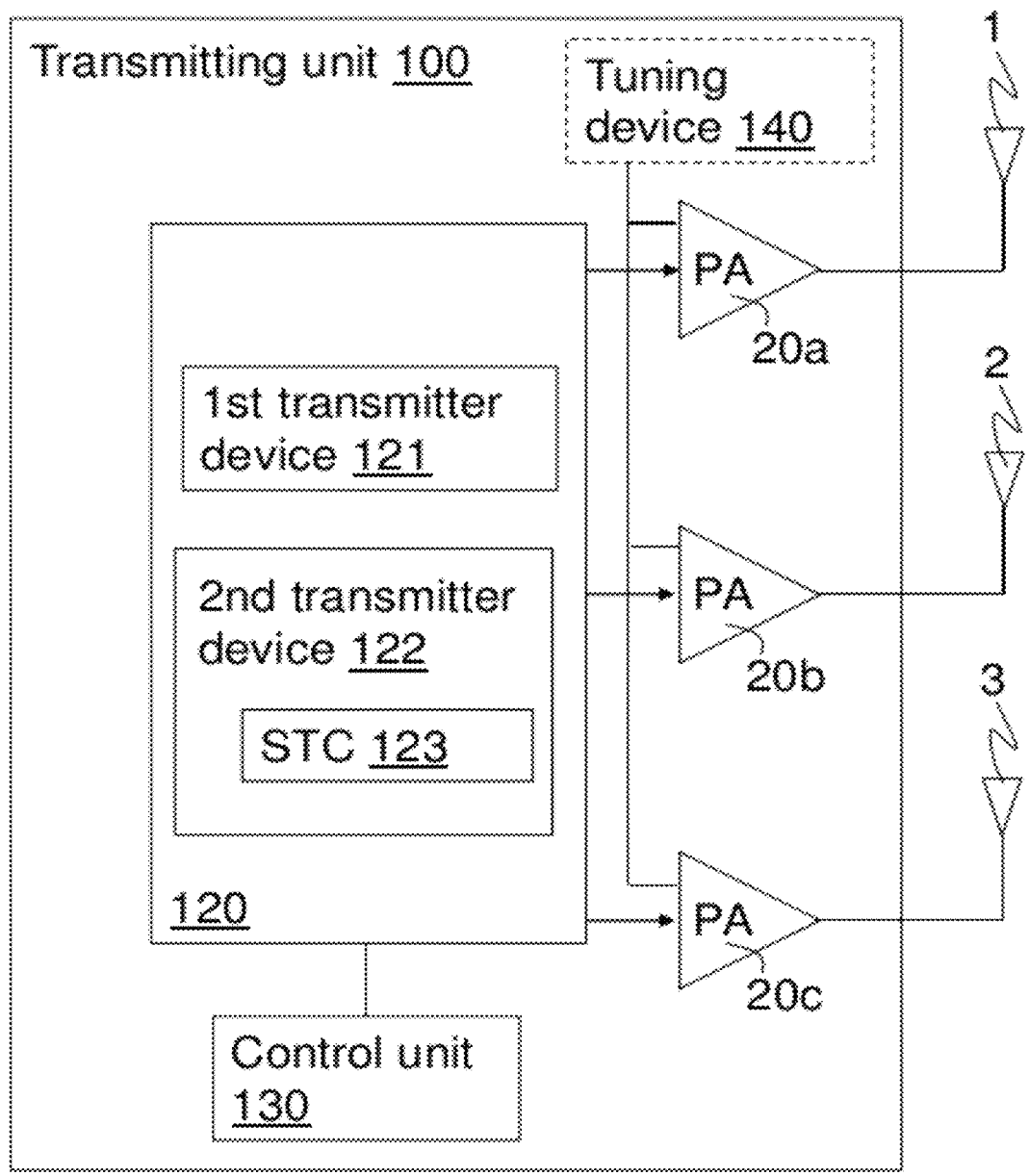
FIG. 10 illustrates schematically the transmitting unit according to embodiments of the present invention.

The transmitting unit 100 is schematically illustrated in FIG. 10, according to embodiments of the present invention. The transmitting unit 100 is configured to transmit over three antennas 1, 2 and 3, pointing in different directions. Each antenna 1, 2, 3, thus provides a beam which only partially overlaps with at least one other of the antennas as they are pointing in different directions. The antennas may in one embodiment be ordinary single antennas and in an alternative embodiment array antennas. The transmitting unit 100 comprises a signal processing unit 120 configured to transmit in a unicast mode, and in a broadcast mode using a STC. In one embodiment the signal processing unit 120 comprises a first and a second transmitter device 121, 122. The first transmitter device 121 is configured to transmit in a unicast mode over each of the antennas 1, 2, and 3, e.g. signal S1(t) over the first antenna 1, signal S2(t) over the second antenna 2, and so on. There may be one conventional power amplifier PA 20*a-c* per antenna. The second transmitter device 122 is configured to transmit in a broadcast mode concurrently over all antennas using a space time code (STC). However, other implementations are also possible and in an alternative embodiment, the signal processing unit 120 only comprises one transmitting device configured to transmit both in unicast mode and in broadcast mode applying STC in different time and/or frequency resources. The signal processing unit 120 may in embodiments of the present invention also comprise an STC encoder 123 that uses any of the STC matrices described above. The broadcast mode may in one embodiment use the MBSFN. Furthermore, the transmitting unit 100 comprises a control unit 130 configured to switch in time between transmitting in unicast mode and transmitting in broadcast mode. The control unit 130 may be a circuit integrated in a processing logic including e.g. a processor, microprocessor, an ASIC, FPGA, or the like.

The transmitting unit 100 illustrated in FIG. 10 is configured to transmit over three antennas. However, any number of antennas is possible, as long as there is more than one. In an alternative embodiment, the transmitting unit is configured to transmit over an even number of antennas pointing in different directions. In this case the STC may be an Alamouti code. Furthermore, the transmitting unit 100 may be configured to use Orthogonal Frequency-Division Multiplexing, OFDM, and may e.g. be an eNB in an e-UTRAN.

In a further embodiment, the transmitting unit 100 comprises a tuning device 140 adapted to tune individual antenna parameters such as the direction, the beam pattern, or the power amplifier, or any combination of these. This makes it possible to obtain a resulting beam pattern with a defined characteristic when transmitting in the broadcast mode concurrently over all of the antennas.

It should be noted that the embodiments described herein are not limited to any specific combination of hardware circuitry and software. The present invention and its embodiments can be realized in many ways. For example, one embodiment of the present invention includes a computer-readable medium having instructions stored thereon that are executable by the transmitting unit of the wireless communications system. The instructions executable by the transmitting unit stored on a computer-readable medium, perform the method steps of the embodiments of the present invention previously described.

The above mentioned and described embodiments are only given as examples and should not be limiting to the present invention.

The invention claimed is:

1. A method for a transmitting unit in a wireless communication system, the transmitting unit being configured to transmit over at least two antennas pointing in different directions, each antenna providing a beam partially overlapping with at least one beam of at least one other of the antennas, the method comprising switching between:
   transmitting in a unicast mode over each of the at least two antennas, and
   transmitting in a broadcast mode concurrently over all of the at least two antennas using a space time code to reduce directional nulls in overlapping radiation patterns of the at least two antennas, the space time code producing a magnitude of complex channel gain for each of the at least two antennas at a communication distance, and an effective signal to noise ratio (SNR) of the transmission in the broadcast mode is based on the magnitude of the complex channel gain as a function of the angle between the at least two antennas;
   wherein switching occurs between symbols transmitted over the at least two antennas, transmitting in the unicast mode comprises transmitting parallel different streams of symbols over different ones of the at least two antennas, and transmitting in the broadcast mode using the space time code comprises transmitting multiple redundant copies of data over all of the at least two antennas with symbols mapped in a time and spatial transmit-antenna domain to capture transmit diversity provided by the at least two antennas.

2. The method of claim 1, further comprising initially tuning at least one of a direction, a beam pattern, and a power amplifier of each of the at least two antennas to obtain a resulting beam pattern with a defined characteristic when transmitting in the broadcast mode concurrently over all of the at least two antennas.

3. The method of claim 2, wherein the defined beam pattern characteristic is an omni-directional beam pattern.

4. The method of claim 1, wherein the broadcast mode uses Multimedia Broadcast and Multicast Services Single Frequency Network.

5. The method of claim 1, wherein the transmitting unit is configured to use Orthogonal Frequency-Division Multiplexing.

6. The method of claim 1, wherein the transmitting unit is configured to transmit over an even number of antennas pointing in different directions, and the space time code is an Alamouti code.

7. The method of claim 6, further comprising initially tuning at least one of a direction, a beam pattern, and a power amplifier of each of the at least two antennas to obtain a resulting beam pattern with a defined characteristic when transmitting in the broadcast mode concurrently over all of the at least two antennas.

8. The method of claim 7, wherein the defined beam pattern characteristic is an omni-directional beam pattern.

9. The method of claim 6, wherein the broadcast mode uses Multimedia Broadcast and Multicast Services Single Frequency Network.

10. The method of claim 6, wherein the transmitting unit is configured to use Orthogonal Frequency-Division Multiplexing.

11. A transmitting unit for a wireless communication system, the transmitting unit being configured to transmit over at least two antennas pointing in different directions, each antenna providing a beam partially overlapping with at least one beam of at least one other of the antennas, the transmitting unit comprising:
   a signal processing unit adapted to transmit in a unicast mode over each of the at least two antennas and to transmit in a broadcast mode concurrently over all of the at least two antennas using a space time code to reduce directional nulls in overlapping radiation patterns of the at least two antennas, the space time code producing a magnitude of complex channel gain for each of the at least two antennas at a communication distance, and an effective signal to noise ratio (SNR) of the transmission in the broadcast mode is based on the magnitude of the complex channel gain as a function of the angle between the at least two antennas; and
   a control unit adapted to switch between transmitting in the unicast mode and in the broadcast mode,
   wherein switching occurs between symbols transmitted over the at least two antennas, transmitting in the unicast mode comprises transmitting parallel different streams of symbols over different ones of the at least two antennas, and transmitting in the broadcast mode using the space time code comprises transmitting multiple redundant copies of data over all of the at least two antennas with symbols mapped in a time and spatial transmit-antenna domain to capture transmit diversity provided by the at least two antennas.

12. The transmitting unit of claim 11, wherein the transmitting unit is configured to transmit over an even number of antennas pointing in different directions, and the space time code is an Alamouti code.

13. The transmitting unit of claim 11, further comprising a tuning device adapted to tune at least one of a direction, a beam pattern, and a power amplifier of each of the at least two antennas to obtain a resulting beam pattern with a defined characteristic when transmitting in the broadcast mode concurrently over all of the at least two antennas.

14. The transmitting unit of claim 13, wherein the defined beam pattern characteristic is an omni-directional beam pattern.

15. The transmitting unit of claim 11, wherein the signal processing unit comprises a first transmitter device adapted to transmit in the unicast mode over each of the at least two antennas, and a second transmitter device adapted to transmit in the broadcast mode concurrently over all of the at least two antennas using the space time code.

16. The transmitting unit of claim 15, wherein the transmitting unit is configured to transmit over an even number of antennas pointing in different directions, and the space time code is an Alamouti code.

17. The transmitting unit of claim 15, further comprising a tuning device adapted to tune at least one of a direction, a beam pattern, and a power amplifier of each of the at least two antennas to obtain a resulting beam pattern with a defined characteristic when transmitting in the broadcast mode concurrently over all of the at least two antennas.

18. The transmitting unit of claim 17, wherein the defined beam pattern characteristic is an omni-directional beam pattern.

19. The transmitting unit of claim 11, wherein the broadcast mode uses Multimedia Broadcast and Multicast Services Single Frequency Network.

20. The transmitting unit of claim 11, wherein the transmitting unit is configured to use Orthogonal Frequency-Division Multiplexing.

* * * * *